Dec. 14, 1965   F. W. DORION ETAL   3,223,192
STEERABLE POWER OPERATED TRACTION WHEEL UNIT
Filed Aug. 16, 1963   2 Sheets-Sheet 1

Inventors:
Bernard B. Becker
Francis W. Dorion
by Russell, Chittick & Pfund
Attorneys

United States Patent Office 3,223,192
Patented Dec. 14, 1965

3,223,192
STEERABLE POWER OPERATED TRACTION WHEEL UNIT
Francis W. Dorion, South Boston, and Bernard B. Becker, Belmont, Mass., assignors to Lewis-Shepard Company, Watertown, Mass., a corporation of Massachusetts
Filed Aug. 16, 1963, Ser. No. 302,574
3 Claims. (Cl. 180—13)

This invention relates to material handling equipment and more particularly to industrial trucks of the type having steerable power operated traction wheel units.

Industrial trucks of the above-mentioned type are presently in extensive use in many diversified phases of industrial activity. In general, a conventional truck assembly can be described as having a longitudinal body supported in the rear by two or more load wheels and in the front by a single steerable power operated traction wheel. The truck body is sub-divided longitudinally into a rear load area, an intermediate battery housing and a forward area occupied by a steerable power operated traction unit. The traction unit must therefore also serve as a supporting strut for the forward end of the truck, sometimes being subjected to compressive forces on the order of 3,000 lbs. or more.

Because a truck of this type is frequently required to operate in congested areas and narrow aisles, it becomes highly desirable to keep its overall length at an absolute minimum, thereby furnishing the user with maximum maneuverability. However, it is also highly desirable to keep both the load area and battery housing as large as possible in order to provide maximum carrying and power storage capacity. Thus it can be seen that a reduction in the maximum cross-sectional dimension of the steerable traction motor unit represented by its turning diameter is extremely advantageous since it decreases overall truck length and increases maneuverability without a corresponding decrease in either carrying capacity or power storage capacity.

The steerable traction motor unit used on conventional trucks of the above-mentioned class is generally comprised of a basic integrally fabricated "C" type supporting strut having upper and lower horizontally disposed arms extending outwardly from a vertical gear casing portion. A drive motor is mounted on the upper arm and connected through a vertical gearing arrangement contained within the central casing portion to a traction wheel rotatably mounted on the lower horizontally disposed arm. The supporting strut is in turn ordinarily mounted for rotation within a large circumferentially disposed annular-type swivel bearing having its outer raceway fixed to the truck frame. In this manner, the combination of drive wheel, supporting strut and drive motor can be rotated as a unit within the surrounding annular swivel bearing in order to provide a means of steering the truck.

As previously mentioned, the gear casing portion of the supporting strut between the traction wheel and the drive motor serves as an enclosure or casing for vertically disposed intermediate power transmission elements such as gears, gear shafts and bearings. However, it should also be noted at this point that because of the "C" configuration of the supporting strut and the cantilever mounting of the drive wheel, the casing portion is also subjected to maximum stress concentrations resulting from driving, braking and the weight of the truck. Consequently, in order to prevent misalignment of the power transmission elements contained therein, the casing must be capable of withstanding these stresses with a minimum of deflection. In addition, it is apparent that in order to achieve a minimum turning diameter, the combination of the annular swivel bearing, motor, intermediate drive elements and support strut should conform as closely as possible to the horizontal circular area that would be required to swivel a traction wheel and tire of the proper size.

Experience has shown that the above-described conventional drive units suffer from several serious disadvantages. To begin with, since annular type swivel bearings must be large enough to axially accept the gear casing portion of the support strut, they become relatively large and expensive to manufacture. In other words, their size is necessarily governed by the outer dimensions of the support strut and not by the load requirements under which they must operate.

Secondly, for a given gear casing cross-sectional area, by placing the annular swivel bearing around the support strut the turning diameter of the drive unit is substantially increased with the result that the overall length of the truck is also increased. Furthermore, since the turning diameter of the drive unit is established by the outside diameter of the annular swivel bearing, the resulting cross-sectional area of the support strut casing portion is limited to the space between the inside face of the drive wheel and the inner diameter of the bearing.

A still further disadvantage inherent in drive units of the above-mentioned type is to be found in the need to cut away a portion of the gear casing at a point corresponding to the point of maximum stress concentration in order to provide access to the vertically disposed gears contained therein. By so doing, the support strut is considerably weakened. To compensate for this weakening, the overall cross-sectional dimensions of the casing and consequently the turning diameter of the unit must be increased even more in order to insure required rigidity.

Consequently, a primary object of the present invention is to provide a steerable power operated traction wheel unit having maximum strength and rigidity and a minimum turning diameter.

Another object of the present invention is to provide a steerable traction wheel unit having an anti-friction bearing assembly positioned at the center of the traction unit in close relationship to the traction wheel.

A further object of the present invention is to provide a steerable traction unit having a turning diameter established by the outside diameter of support strut rather than the outside diameter of the swivel bearing.

Another object of the present invention is to provide a traction wheel unit employing a vertical shaft for transmitting driving torque from the drive motor to the rotatable drive wheel axle.

A further object of the present invention is to provide a support strut for a steerable power operated traction wheel unit having a central casing portion uninterrupted by gear access apertures.

These and other objects of the present invention will become more apparent as the description proceeds with the aid of the accompanying drawings in which:

FIG. 3 is a sectional view taken along line 3—3 of FIG. 2.

Figure 1:
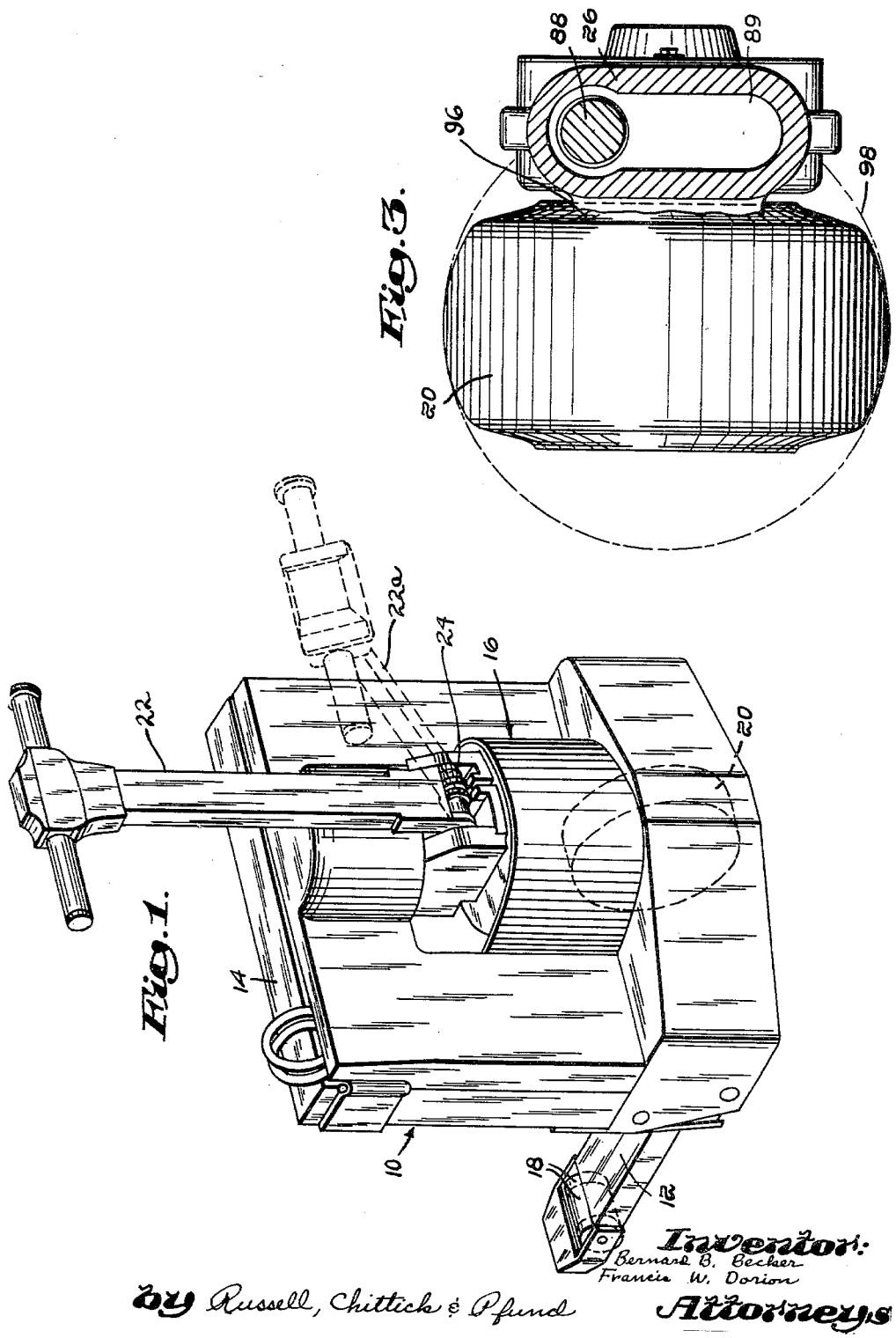
FIG. 1 is a perspective view of a material handling truck supported at its forward end by a steerable power operated traction wheel unit embodying the concepts of the present invention.

Referring now to FIG. 1, a material handling truck generally indicated at 10 is shown having a rearwardly extending load platform 12, a battery housing 14 and a forwardly disposed steerable power operated traction wheel unit 16. The truck is supported by load bearing wheels 18 at its rear end and a single traction wheel 20 at the forward end.

Upwardly disposed control handle 22 is pivotally mounted as at 24 to the traction wheel unit 16 and when lowered to an operative position as indicated at 22a is used by the operator in controlling the movement of the truck. The aforementioned features are standard on conventional material handling trucks of this class and are not essential to the further description of the invention.

Figure 2:
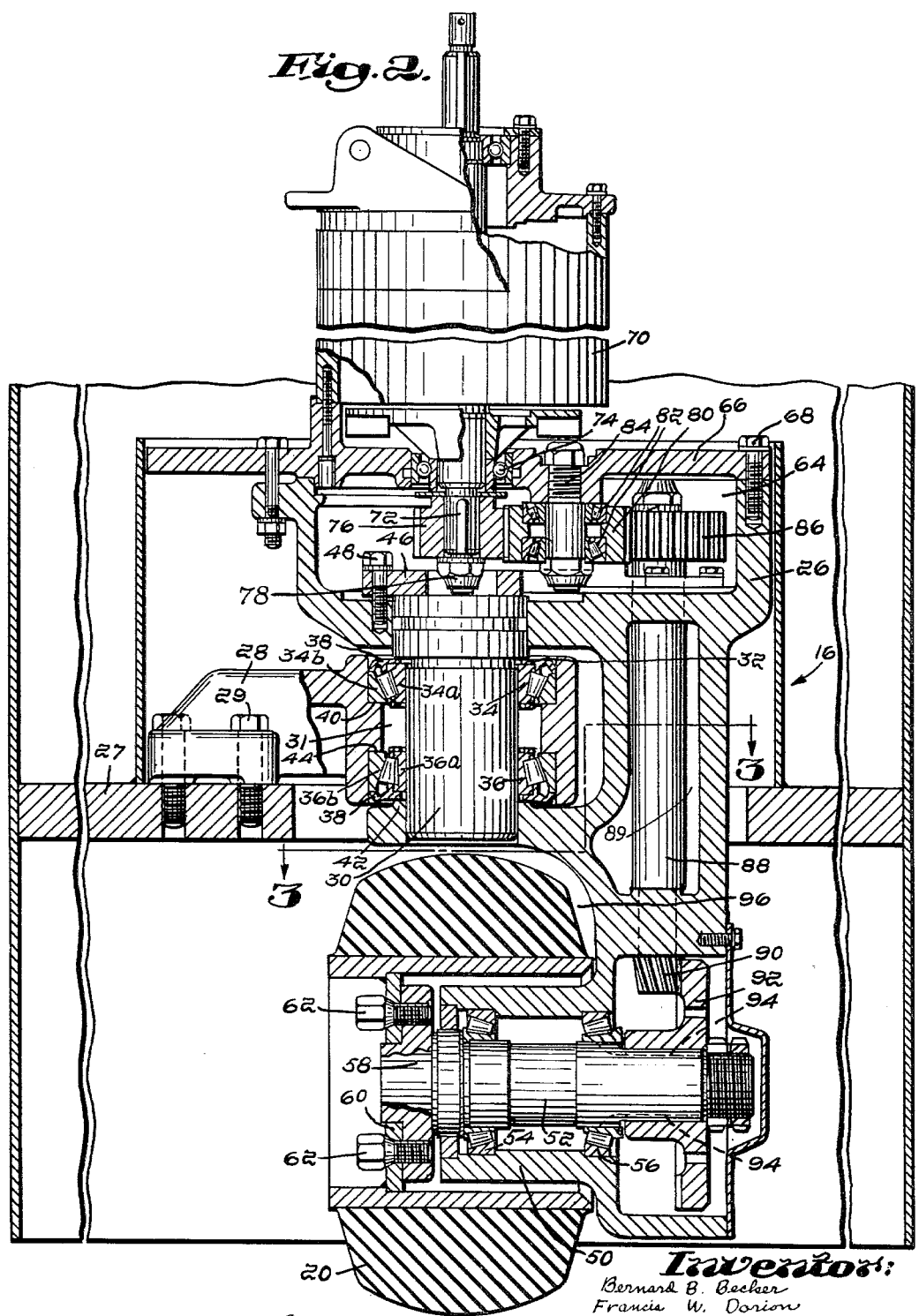
FIG. 2 is a view in sectional elevation taken through the traction wheel unit.

As can be seen in FIG. 2, the traction wheel unit generally indicated at 16 in FIG. 1 is shown having a basic frame structure comprised of C-shaped support strut 26. Support strut 26 is pivotally connected to a fixed cantilever member 28 on the main frame 27 of truck 10 by means of a pivot or king pin 30. Cantilever member 28 is rigidly attached to frame 27 by bolts indicated typically at 29. Pin 30 is journaled for rotation within a vertically disposed passageway 31 in cantilever member 28 by means of spaced upper and lower thrust bearing assemblies 34 and 36. In the preferred embodiment herein shown, each thrust bearing assembly is provided with lip seals 38 which effectively prevent the escape of lubricant from the bearings while at the same time excluding foreign matter such as dirt and grit.

The inner race 34a of upper thrust bearing assembly 34 is downwardly engaged by an annular shoulder 32 on pin 30, its outer race 34b in turn seated within an inwardly disposed ledge 40 in passageway 31. In a similar fashion, the inner race 36a of lower bearing assembly 36 is upwardly engaged by annular shoulder 42 of support strut 26, its outer race 36b being again seated within a second inwardly disposed ledge 44. Support strut 26 is held in fixed relationship with respect to pivot pin 30 by a downward force exerted thereon from the combined action of keeper plate 46 and a plurality of bolts indicated typically at 48. Thus it can be seen that the combination of support strut 26 and pin 30 may be pivoted with respect to cantilever member 28 about the longitudinal axis of pin 30 within bearing assemblies 34 and 36.

When fully assembled, an upward supporting force is transmitted from traction wheel 20 through support strut 26 and lower thrust bearing assembly 36 to cantilever member 28. Should the drive wheel unit experience a severe jar or bump during rough handling, causing the forward end of the truck to momentarily leave the ground, upper thrust bearing 34 will provide the steerable traction unit 16 with axial support in an opposite direction. In addition, both upper and lower bearing assemblies 34 and 36 provides constant radial support for pin 30.

Important advantages are gained from the central positioning of relatively small diameter swivel bearing assemblies 34 and 36 within the steerable traction wheel unit 16. This design permits the use of swivel bearings selected on the basis of adequate bearing capacity for the desired application rather than the external size of the support strut 26. It also permits the use of low cost standard size commercially available bearings without the need to resort to expensive custom made annular bearings necessitated by conventional designs. Furthermore, the relatively small size of the bearings facilitates the task of providing effective seals for the retention of lubricants and the exclusion of foreign matter such as dirt and grit.

Support strut 26 is provided at its lower extremity with a relatively short horizontally disposed tubular arm 50 having horizontally disposed traction wheel shaft 52 journalled therein between bearing assemblies 54 and 56. Shaft 52 is additionally provided at one extremity with an integrally fabricated end flange 58 to which is attached the hub 60 of traction wheel 20 by a plurality of bolts indicated typically at 62.

Having thus described the basic structure of the drive wheel unit, the means for driving traction wheel 20 will now be described. The upper end of C-shaped supporting strut 26 terminates in a second horizontally disposed arm comprised of a circular upper gear chamber 64 having a top cover member 66 bolted thereon by bolts indicated typically at 68. A vertically disposed traction motor 70 is mounted on top cover member 66 with its drive shaft 72 journaled within bearing assembly 74 and extending downwardly therethrough. It can be readily appreciated that drive motor 70 is powered in a conventional manner by storage batteries contained within battery housing 14.

Drive gear 76 is fixed to the threaded extremity of shaft 72 by nut 78 for rotation therewith. Intermediate idler gear 80 is mounted through bearing 82 on non-rotatable shaft 84 in meshed relationship with both drive gear 76 and spur gear 86 in turn mounted on the upper extremity of vertically disposed intermediate drive shaft 88. Shaft 88, which extends vertically through a fully enclosed passageway 89 in support strut 26, is further provided at its lower extremity with an integrally cut hypoid type pinion gear 90 in meshed relationship with gear 92 positively keyed as at 94 to traction wheel shaft 52.

It can therefore be seen that through the aforementioned arrangement driving torque is transmitted horizontally from traction motor shaft 72 through gears 76, 80 and 86, then downwardly through intermediate drive shaft 88 to traction wheel shaft 52.

As previously mentioned, important advantages are gained by utilizing intermediate vertical drive shaft 88 in place of a vertical gear train as presently used in conventional designs for transmitting drive torque from the upper horizontal aligned gears to gear 92 on traction wheel shaft 52. As can be seen in FIG. 3, because the cross-sectional area of the vertical shaft 88 is much less than the corresponding cross-sectional area of conventional vertical gear trains, more space is provided for casing material thickness in the high stress area between the inner face 96 of the traction wheel and the outer edge of the traction unit. It should also be noted that this increase in casing material thickness can be accomplished without a corresponding increase in the overall turning diameter of the unit.

As can further be seen from FIG. 3, circle 98 indicates the projected path of a point on the circumference of traction wheel 20 during pivotal displacement of the traction wheel unit with respect to the truck frame. It can be readily appreciated that the diameter of wheel 20 and consequently the diameter of circle 98 represents the minimum possible turning diameter of any traction unit. By providing a small diameter vertical intermediate shaft 88, the casing thickness can be kept to a maximum while at the same time permitting the overall cross-sectional dimension of the unit to closely approximate the diameter of circle 98.

In addition, by providing a removable top cover member 66, intermediate drive shaft 88 having hypoid type pinion gear 90 integrally cut thereon can be axially inserted and withdrawn from above. In this manner, the casing portion of the strut can be made to fully envelop the intermediate drive shaft 88 in an uninterrupted tubular shaped enclosure, thereby effectively resisting radial and compressive forces acting upon it at this point without being weakened by gear access apertures.

It is our intention to cover all changes and modifications of the example of the invention herein chosen for purposes of disclosure which do not constitute departures from the spirit and scope of the invention.

What is claimed is:

1. A steerable power operated traction wheel unit for use with a material handling truck comprising the combination of: a cantilever member extending outwardly from said truck, said cantilever member having a passageway extending vertically through the unsupported distal end thereof; annular bearing means positioned within said passageway; a support strut having an intermediate section with a gear chamber at its upper end and a laterally disposed tubular extension at its lower end, said gear chamber connected to said tubular extension by a fully enclosed passageway extending vertically through said intermediate section; a pivot pin fixed relative to said support strut, said pivot pin journaled for rotation within said bearing means in order to pivotally connect said support strut to said cantilever member; a traction motor carried by the upper end of said support strut; an axle journaled for rotation within said tubular extension; a traction wheel fixed to one end of said axle; a vertically disposed drive shaft journaled for rotation within the fully enclosed passageway in said intermediate section; gear means connecting the lower end of said drive shaft to the other end of said axle; and, a horizontally aligned gear train contained within said gear chamber, said gear train being operative to connect the traction motor to the upper end of said drive shaft.

2. For use with a material handling truck having a main frame, a steerable power operated traction wheel unit comprising the combination of: a support strut having an intermediate section with upper and lower substantially parallel arm portions extending laterally therefrom; a traction wheel rotatably mounted on said lower arm portion; drive means mounted on said upper arm portion; means including a vertically disposed drive shaft journaled for rotation within said intermediate section for connecting said drive means to said traction wheel; means associated with said intermediate section for supporting a vertically disposed pivot pin, the axis of said pivot pin being parallel to the rotational axis of said drive shaft and spaced laterally therefrom towards the center of said support strut, said pivot pin extending vertically through said main frame to pivotally connect said support strut to said truck; and annular bearing means positioned between said main frame and said pivot pin, whereby said support strut may be pivoted relative to said frame about the axis of said pivot pin when steering said truck.

3. A steerable power operated traction unit for use in driving a truck, said unit comprising the combination of: a horizontally disposed cantilever member having one extremity rigidly attached to the frame of said truck, the other extremity of said cantilever member extending outwardly from said frame and having a vertically disposed aperture extending therethrough; an integrally fabricated support strut provided at its upper extremity with an upper gear chamber having a removable top cover and at its lower extremity with a horizontally disposed tubular extension, said upper gear chamber connected to said tubular extension by a fully enclosed vertical passageway, said support strut further provided with a centrally positioned aperture therethrough; means for pivotally attaching said support strut to said cantilever member, said means comprising a central pin axially seated within said centrally positioned aperture in said support strut and said vertically disposed aperture in said cantilever member, said central pin held in fixed relationship to said support strut in order to provide for its pivotal movement with said support strut in relation to said cantilever member; bearing means intermediate said central pin, and said cantilever member, said bearing means comprising at least one annular thrust bearing surrounding said pin and contained within said vertically disposed aperture in said cantilever member; a traction motor mounted on the removable top cover of said upper gear chamber; the drive shaft of said motor extending through said cover into said gear chamber; a traction wheel shaft rotatably mounted within said lower tubular extension and having a traction wheel fixed to its outer extremity for rotation therewith, the other extremity of said traction wheel shaft having a gear mounted thereon; a vertically disposed intermediate drive shaft rotatably mounted within said fully enclosed vertical passageway and provided at its lower extremity with a spur gear meshing with said gear on said traction wheel shaft; the upper extremity of said intermediate drive shaft connected to said traction motor drive shaft by a horizontally aligned gear train contained within said upper gear chamber.

References Cited by the Examiner

UNITED STATES PATENTS

| | | | |
|---|---|---|---|
| 2,327,583 | 8/1943 | Framhein | 180—19 |
| 2,399,605 | 4/1946 | Schroeder | 180—65 |
| 2,564,002 | 8/1951 | Gibson | 180—65 X |
| 2,613,753 | 10/1951 | Stuebing | 180—12 |
| 2,767,800 | 10/1956 | Joy | 180—13 X |
| 3,061,031 | 10/1962 | Packward | 180—65 X |

BENJAMIN HERSH, *Primary Examiner.*

LEO FRIAGLIA, A. HARRY LEVY, *Examiners.*